May 3, 1960 J. PARSTORFER 2,934,970
CONTROL MECHANISM FOR ROTATIONAL DEVICES
Filed Aug. 27, 1958 3 Sheets-Sheet 1

INVENTOR.
JOHN PARSTORFER
BY
AGENT

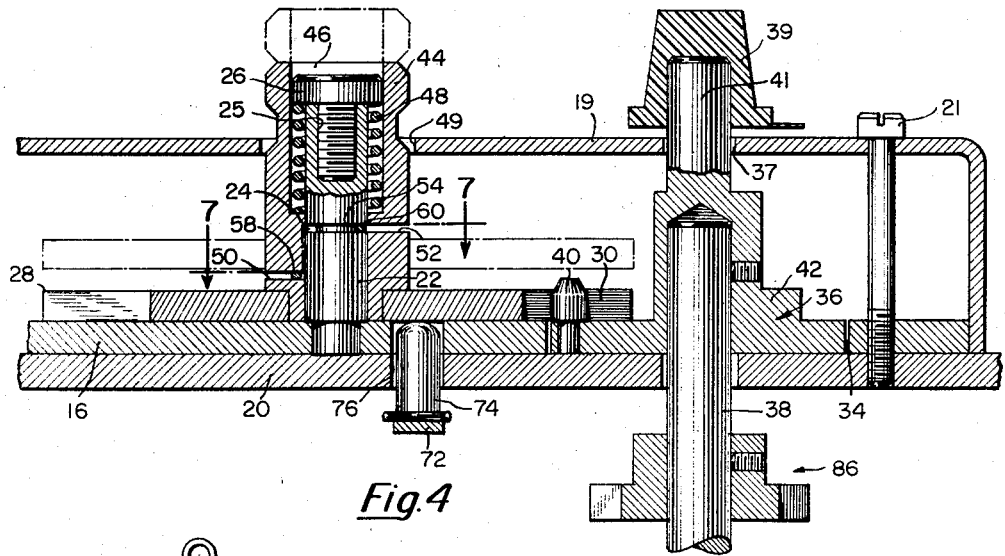
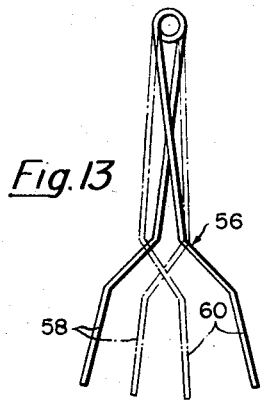
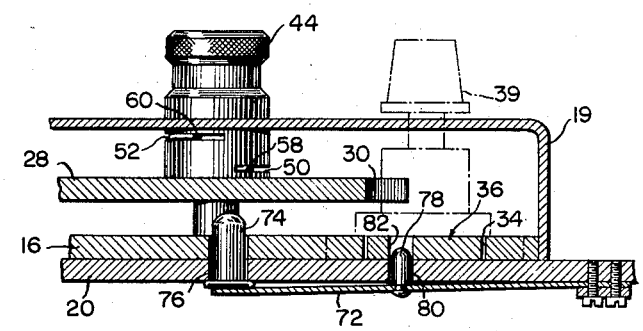
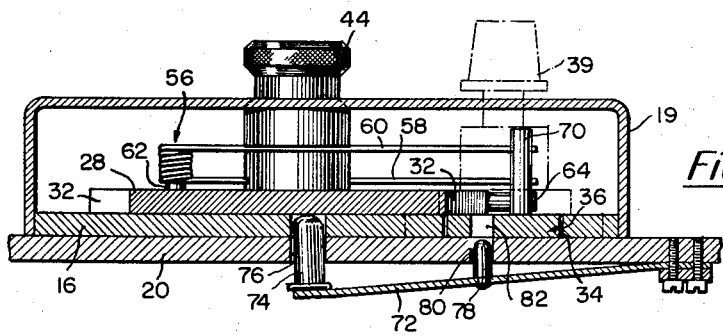

May 3, 1960 J. PARSTORFER 2,934,970
CONTROL MECHANISM FOR ROTATIONAL DEVICES
Filed Aug. 27, 1958 3 Sheets-Sheet 3

INVENTOR.
JOHN PARSTORFER
BY
AGENT

United States Patent Office 2,934,970
Patented May 3, 1960

2,934,970
CONTROL MECHANISM FOR ROTATIONAL DEVICES

John Parstorfer, Philadelphia, Pa., assignor to Burroughs Corporation, Detroit, Mich., a corporation of Michigan Application August 27, 1958, Serial No. 757,539

21 Claims. (Cl. 74—436)

This invention relates generally to controls and particularly to apparatus for controlling rotational devices. While not limited thereto, the invention finds special application in mechanism for controlling the operation of rotary switches.

It is therefore an important object of the present invention to provide means for controlling the rotary movements of rotational devices.

Another object of the invention is to provide apparatus having presettable means to control the movement of a mechanism.

Still another object of the invention is to provide such a device which will automatically lock up when a predetermined angular movement of a rotational device has been made.

A further object of the invention is to provide such a mechanism with means operable only at the end of a predetermined angular movement to reset the mechanism for another operation.

A more specific object is to provide a variable rotation counter for operating a rotary switch wherein means is provided to lock up the switch when a desired number of rotary movements of the latter has been made.

A further object is to provide control means for rotary devices comprising anti-backup means for unidirectional operation, and lock-up means operable at the end of a predetermined number of rotative movements of the rotary device to lock up the same and to maintain its positional relationship with respect to the control means during resetting so that subsequent and repeated rotations of the rotary device will be accomplished in timed relation to the control means.

Another object of the invention is to provide control mechanism which is particularly characterized by its safety of operation, its unique lock-up features and its extreme reliability in operation.

These and other objectives will be more fully revealed from the following detailed description of a specific embodiment of the invention when read in conjunction with the accompanying drawings, in which:

Fig. 4 is a sectional view taken along line 4—4 of Fig. 2;

Fig. 5 is a sectional view taken along line 5—5 of Fig. 2;

Fig. 6 is a sectional view taken along line 6—6 of Fig. 3;

Fig. 13 is a view showing two conditions of a lock-up spring component.

Considered briefly in its broad aspects, the invention comprises apparatus including stepping means coupled to a unidirectional device, preferably a rotatable element such as a rotary switch, and presettable means to limit the latter to a predetermined number of rotative movements. Means are provided to lock the stepping means and rotatable element in their coupled relation until the predetermined number of rotative movements has been made, at which time the lock-up is automatically released to permit the apparatus to be reset for a repeat cycle of rotations.

Figure 1:
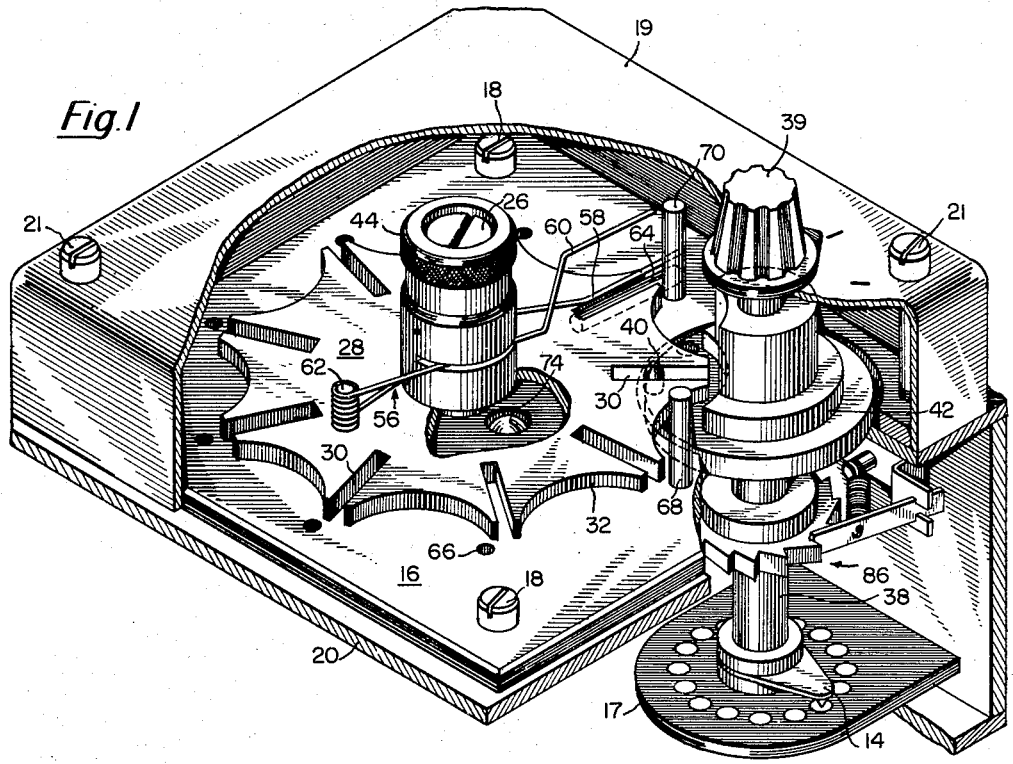
Fig. 1 is a perspective view illustrating one embodiment of the present invention with portions broken away.

Referring now to the details of the drawings illustrating a preferred embodiment of the invention, it is seen that it is being used for controlling a rotary switch, indicated in Fig. 1 by the numeral 14, in accordance with a desired, predetermined number of revolutions of the latter. As seen in this figure, the apparatus comprises a base plate 16, secured by screws 18 to a panel 20 of an associated apparatus, the latter housing or otherwise fixedly mounting a contact panel 17 for the switch 14. A cover 19 encloses a portion of the apparatus and is secured to base plate 16 by means of screws 21.

Figure 8:
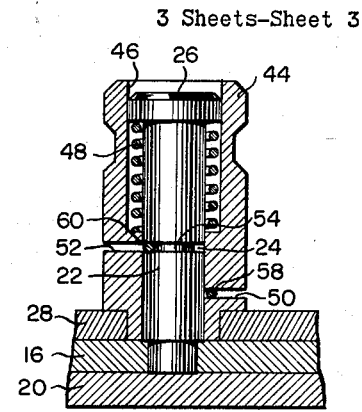
Fig. 8 is a sectional view taken along line 8—8 of Fig. 7.
Figure 10:
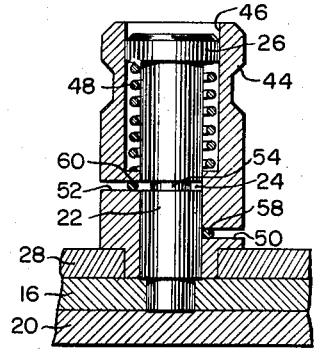
Fig. 10 is a sectional view taken along line 10—10 of Fig. 9.
Figure 12:
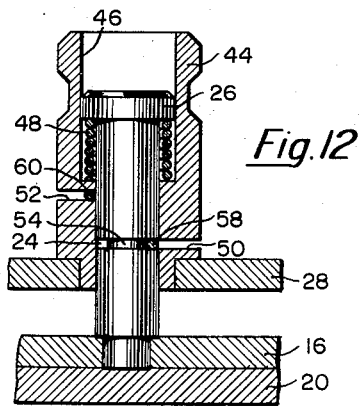
Fig. 12 is a sectional view taken along line 12—12 of Fig. 11.

Secured to base plate 16, as by pressfitting, or other suitable manner, is a reset shaft 22, shown most clearly in Figs. 8, 10 and 12. Shaft 22 is formed with a circular recess 24 adjacent its medial portion and with a tapped hole 25 (Fig. 4) at its upper end for threadedly receiving a screw 26.

Figure 2:
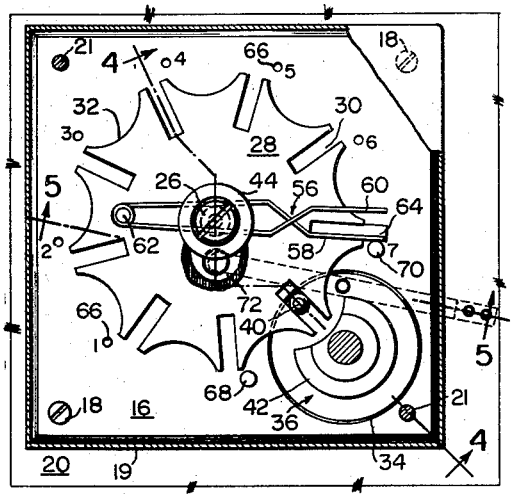
Fig. 2 is a plan view, on a smaller scale, of the device shown in Fig. 1 with portions broken away and showing the device at a start position.
Figure 3:
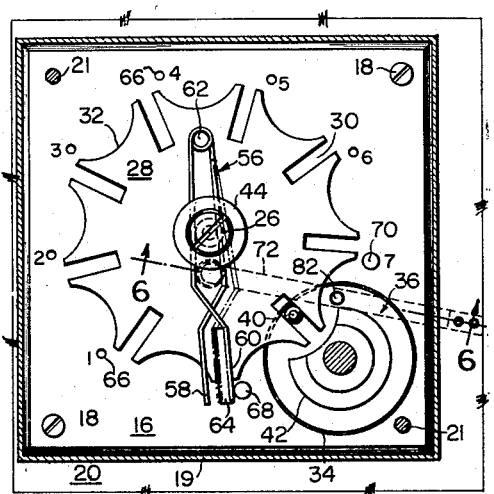
Fig. 3 is a view similar to that shown in Fig. 2 but showing the device at its stop position.

A stepping element, preferably a Geneva gear wheel 28, is mounted above base plate 16 for rotation about the axis of shaft 22. The Geneva gear wheel 28 is formed in the usual manner of a disc having cut-out portions, or radial slots 30, and arcuate lock-up portions 32. Base plate 16 has an aperture 34 (Fig. 4) extending therethrough and forming with panel 20 a counterbore, or seat, for rotatably receiving a Geneva driving pinion 36 secured to a shaft 38 for transmitting motion to switch 14 also secured to the same shaft beneath panel 20. A shaft portion 41 of Geneva drive pinion 36 extends through a clearance hole 37 in cover 19 and has secured to its outer end a turning knob 39. A drive pin 40 is secured to pinion 36 for driving gear wheel 28 in the usual manner by engaging in a slot 30. A circular lock-up portion 42 (Fig. 2) of pinion 36 also engages an arcuate lock-up portion 32, as is customary, to lock up the gear wheel 28 against rotation after each operation of pinion 36.

A reset knob 44 secured to Geneva gear wheel 28 is rotatably and slidably mounted on shaft 22 and is provided at its upper end with a counterbore 46 for receiving a helical compression spring 48 and the head of screw 26. Cover 19 is provided with a clearance hole 49 to permit axial movement of reset knob 44 which projects therethrough. Spring 48 is under compression between the head of screw 26 and the shoulder of counterbore 46 and is thereby effective to bias the Geneva gear wheel 28 downwardly to a position adjacent base plate 16 as shown in Figs. 4 and 5.

The reset knob 44 is formed with two transverse slots 50 and 52 respectively, 180° apart, which extend inwardly a distance preferably somewhat deeper than the neck diameter 54 formed by recess 24 in shaft 22.

Lock-up means is provided by a helical spring 56 having its ends formed to provide bent spring fingers 58 and 60 respectively. In Fig. 13, the lockup spring is shown in solid lines in its normal condition when removed from the apparatus, with spring fingers 58 and 60 crossing over each other, while the broken lines show the general configuration of the spring when assembled in the apparatus, with the spring fingers crossing over each other in the same manner but at a different point. The convoluted portion of spring 56 is received on an upstanding post 62 (Fig. 5) secured to Geneva gear wheel 28 and spring fingers 58 and 60 are received respectively in slots 50 and 52 of reset knob 44. In such position, the lock-up spring has the preloaded configuration shown in broken lines in Fig. 13 with spring fingers 58 and 60 exerting a force against shaft 22. Adjacent the outer ends of the spring fingers is a limit pin 64 inserted radially in one of the slots 30 of Geneva gear wheel 28 and secured to the gear wheel as by pressfitting or other suitable means.

Base plate 16 is formed with a series of tapped holes 66 equally spaced around gear wheel 28 and in the path of movement of spring fingers 58 and 60, and limit pin 64. One of the holes 66 is preferably permanently fitted with a stop stud or pin 68, while the remaining holes 66 are used selectively to insert a program stud, or stop pin 70, in accordance with a desired number of rotations of switch 14, and are numbered from 1 to 7 to represent different program positions or rotations of switch 14.

Secured at one of its ends to the under side of panel 20 is a spring leaf 72 (Fig. 5) having secured to its free end a feeler plunger 74 adapted for sliding movement within an aligned aperture 76 extending through panel 20 and base plate 16, and having secured at its medial portion a detent pin 78 slidingly engaged in an aperture 80 in panel 20 and adapted to engage in a locking detent hole 82 in Geneva drive pinion 36.

In accordance with the drawings which for purpose of illustration show the program stud 70 secured in a hole 66 designated as the number 7 position, the operation of the device will be described for producing seven revolutions of switch 14. It is to be understood that while the illustrated embodiment is constructed both for manual operation and manual resetting, the invention contemplates the use of other means for performing such operations.

Figure 7:
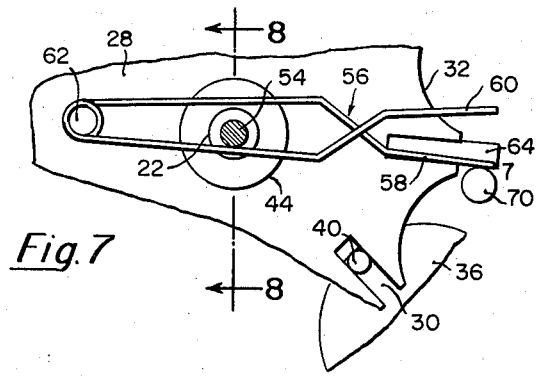
Fig. 7 is a fragmentary view of a portion of the device as shown in Fig. 2 and taken along line 7—7 of Fig. 4.

At the beginning of a cycle of revolutions of the switch, slot 52 will be in line with recess 24 and finger 60 will be received in the recess (Fig. 8), thereby locking the reset knob 44 and the Geneva gear wheel 28 against axial movement on shaft 22. Spring finger 58 will be bearing against the major diameter of shaft 22 and limit pin 64 will be in abutting relation with program stud 70 (Fig. 7). Drive pin 40 of pinion 36 will be engaged in a slot 30 in gear wheel 28 while detent pin 78 will be held in its retracted position, as seen in Fig. 5, by reason of the lower surface of gear wheel 28 blocking the upward movement of feeler plunger 74.

Figure 9:
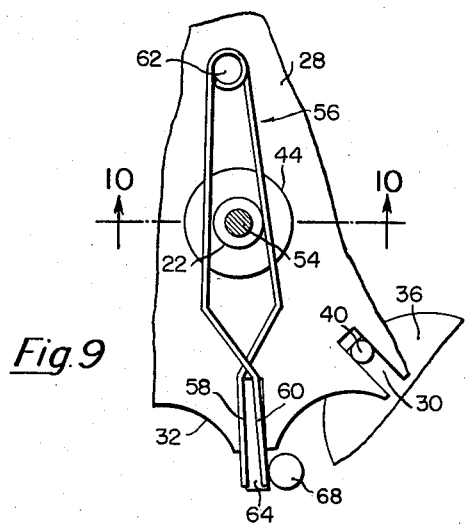
Fig. 9 is a view similar to Fig. 7 but showing the mechanism in a different operating position.

The device is operated for rotating switch 14 by turning knob 39 in a clockwise direction according to the preferred arrangement here illustrated. As seen in Fig. 1, shaft 38 is adapted for clockwise rotation only by reason of a ratchet anti-backup mechanism indicated generally by the numeral 86. Accordingly, for each rotation of shaft 38 there will be one revolution of switch 14, and an intermittent counter-clockwise rotation or stepping movement of Geneva gear wheel 28 from one program position to the next, thus representing a count of one revolution of the switch for each intermittent rotation of the gear wheel. Since there are seven program positions in the illustrated example, with program stud 70 set at number 7 position (Figs. 2 and 7), it will be obvious that the switch will have been rotated seven complete turns when limit pin 64 and spring fingers 58 and 60 have arrived at stop stud 68 (Fig. 9). As the limit pin is approaching the stop stud, spring finger 60, in advance of the limit pin, abuts the stop stud and continued rotation of the gear wheel to the final stop position—where the limit pin abuts the stop stud—will cause spring finger 60 to be urged out of recess 24 thereby unlocking reset knob 44 from reset shaft 22 (Figs. 9 and 10). Thus, at the stop position the Geneva wheel cannot be turned further by reason of the limit pin abutting the stop stud and cannot be turned reversely by reason of the ratchet anti-backup mechanism. However, reset knob 44 and gear wheel 28 are now free to be moved axially along shaft 22 for a reset movement.

Figure 11:
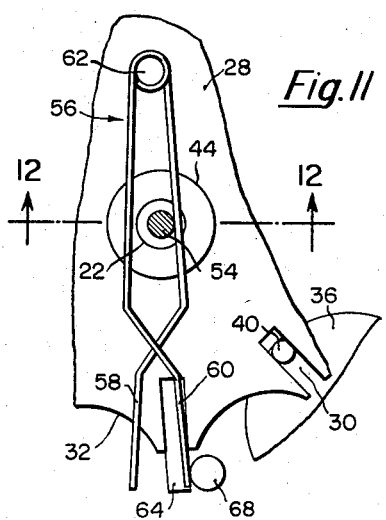
Fig. 11 is a view similar to Fig. 9 but showing the mechanism in still another operating position.

The device is reset by pulling reset knob 44 upwardly against the biasing action of spring 48 until spring finger 58 springs into recess 24 of shaft 22 (Figs. 11 and 12), thereby locking the reset knob and gear wheel in a raised position thus to disengage the gear wheel from the pinion drive pin 40, and allowing the feeler plunger 74 to move upwardly under the biasing action of spring leaf 72 to thereby engage detent pin 78 in detent hole 82 of pinion 36 (Fig. 6), and thus lock the pinion to panel 20 and against rotation.

The reset knob is then turned clockwise to rotate the Geneva gear wheel and bring the limit pin and lock-up spring back to the starting position at the program stud 70. As the limit pin and lock-up spring are approaching the program stud, spring finger 58, in advance of the limit pin, comes against the program pin until it is urged thereby out of recess 24 in the reset shaft, whereupon the reset knob and gear wheel will be pressed downwardly under the action of spring 48 into operating position, in which position slot 52 in the reset knob will again be in line with recess 24 to allow spring finger 60 to spring into the recess and lock the gear wheel in its operating position against axial movement on the reset shaft. Simultaneously with the downward movement of the gear wheel which depresses feeler plunger 74 to its lower position (Fig. 5), detent pin 78 will thereby be withdrawn from detent hole 82 in the pinion to free the same for further rotation, its drive pin 40 having been reengaged with the gear wheel by the downward motion of the latter.

By inserting the program stud 70 in other of the holes 66 it will be apparent that a different number of rotations of the switch may be obtained. Thus, if the program stud is placed in a hole 66 at the number 6 position, six rotations of the switch can be made. If the program stud is placed in the number 5 position, the switch can then be operated for five rotations. Therefore, any number of rotations may be selected, up to seven in the illustrated embodiment. The reset knob and cover may be appropriately graduated to give a visual indication at any time of the number of rotations remaining. The apparatus can only be operated in one direction and without the possibility of double switching or performing a reset operation out of time.

From the foregoing description it will now be apparent that the invention provides an operating mechanism for safe control of rotational devices, particularly switches, with unique lock-up features and foolproof operation.

While there has been disclosed a specific embodiment of the invention, it will be apparent to those skilled in the art that the invention may be constructd in various forms without departing from the spirit thereof. Accordingly, it is to be understood that the illustrated device is a preferred embodiment of the invention and that the invention should not be limited thereby, but only by the subjoined claims.

What is claimed is:

1. Apparatus for prearranging and controlling the extent of angular motion of a rotation device comprising, a driving member rotatable with said device, a stepping element coupled to said driving member for rotation thereby between start and stop positions, reset means operable to uncouple the stepping element from the driving member and to reset the former from stop to start position, locking means to secure said driving member against rotation while it is uncoupled from said stepping element, and means to recouple the stepping element into driven relation with said driving member and to disengage said locking means for freeing the driving member for further rotation.

2. Apparatus for prearranging and controlling the extent of motion of a rotation device comprising, a driving member rotatable with said rotation device, a stepping element coupled to said driving member for rotation thereby from a preselected one of a plurality of start positions to a stop position, reset means operable at said stop position for uncoupling the stepping element from the driving member and for turning back the former to said start position, locking means to secure said driving member against rotation while it is uncoupled from said stepping element, and means operating at said start position to recouple the stepping element into driven relation with said driving member and to disengage said locking means to free said driving member for further rotation.

3. An operating mechanism for a rotation device comprising, a Geneva pinion rotatable with said device, a Geneva gear wheel coupled to said pinion for rotation thereby between start and stop positions, reset means operable to uncouple the gear wheel from the pinion and to reset the former from stop to start position, locking means to secure said pinion against rotation while it is uncoupled from said gear wheel, and means to recouple the gear wheel into driven relation with said pinion and to disengage said locking mans for freeing the pinion for further rotation.

4. Apparatus for prearranging and controlling the extent of angular motion of a rotation device comprising, a Geneva pinion rotatable with said rotation device, a Geneva gear wheel coupled to said pinion for rotation thereby from a preselected one of a plurality of start positions to a stop position, reset means operable at said stop position for uncoupling the gear wheel from the pinion and for turning back the former to said start position, locking means rendered effective by the operation of said reset means to secure said pinion against rotation while it is uncoupled from the gear wheel, and means operating at said start position to recouple the gear wheel into driven relation with the pinion and to disengage said locking means to free said pinion for further rotation.

5. Apparatus for prearranging and controlling the extent of angular motion of a rotation device comprising, a driving member rotatable with said rotation device, a stepping element coupled to said driving member for rotation thereby from a preselected one of a plurality of start positions to a stop position, a shaft rotatably mounting said stepping element, means including a reset member for locking the stepping element against axial movement on said shaft when said apparatus is turning said rotation device, said reset member being operable at said stop position for uncoupling the stepping element from the driving member and for turning back the former to said start position, locking means to secure said driving member against rotation while it is uncoupled from said stepping element, and means operating at said start position to recouple the stepping element into driven relation with said driving member and to disengage said locking means to free said driving member for further rotation.

6. Apparatus for prearranging and controlling the extent of angular motion of a rotation device comprising, a driving member rotatable with said rotation device, a stepping element coupled to said driving member for rotation thereby from a preselected one of a plurality of start positions to a stop position, reset means operable at said stop position for uncoupling the stepping element from the driving member and for turning back the former to said start position, locking means to secure said driving member against rotation while it is uncoupled from said stepping element, program means adapted to be preset at any of said start positions, and means carried by said stepping element and operative to cooperate with said program means to recouple the stepping element into driven relation with said driving member and to disengage said locking means to free said driving member for further rotation.

7. A rotation counting and lock-up mechanism for a rotation device comprising, a Geneva pinion rotatable with said rotation device, a Geneva gear wheel coupled to said pinion for rotation thereby from a preselected one of a plurality of start positions to a stop position, a shaft rotatably mounting said gear wheel, means including a reset member for locking the gear wheel against axial movement on said shaft when said mechanism is turning said rotation device, said reset member being operable at said stop position for uncoupling the gear wheel from said pinion and for turning back the former to said start position, locking means to secure said pinion against rotation while is it uncoupled from the gear wheel, program means adapted to be preset at any of said start positions for limiting in accordance with said setting the extent of rotation of said device, and means carried by said gear wheel and operative to cooperate with said program means to recouple the gear wheel into driven relation with the pinion and to disengage said locking means to free said pinion for further rotation.

8. A rotation counting and lock-up mechanism according to claim 7 wherein said locking means are rendered effective by the operation of said reset member to secure said pinion against rotation while it is uncoupled from said gear wheel.

9. A rotational counting mechanism comprising, a rotatable driving member, a stepping element coupled to said driving member for rotation thereby between a start position and a stop position, a shaft rotatably mounting said stepping element, a reset member operable at said stop position for uncoupling the stepping element from said driving member and for resetting the former to said start position, a spring element cooperating with said shaft for locking the stepping element against axial movement on said shaft when said driving member is rotating the stepping element, locking means rendered effective by the operation of said reset member to secure the driving member against rotation while it is uncoupled from the stepping element, program means adapted to be preset in one of a plurality of positions to limit in accordance with said setting the extent of rotation of said mechanism, said spring element being operative to cooperate with said program means at the end of a resetting movement to release said stepping element for axial movement on said shaft, and means operating concurrently with said release to recouple the stepping element into driven relation with the driving member and to disengage said locking means for freeing the driving member for further rotation.

10. An operating mechanism for a rotational device comprising, a driving member rotatable with said device, a disc coupled to said driving member for rotation thereby from a preselected one of a plurality of positions to an advanced position, a program pin preset in one of said plurality of positions and a stop pin set in said advanced position, limit means carried by said disc and cooperating with said pins to limit the extent of rotation of the disc, a reset member operable at said stop position for uncoupling the disc from said driving member and for resetting the former to said preset position, a shaft rotatably mounting said disc and reset member, a spring element cooperating with said shaft for locking the disc against axial movement on said shaft when said driving member is rotating the disc, said spring element being operative to cooperate with said program pin at the end of a resetting movement to release said disc for axial movement on said shaft, locking means rendered effective by the operation of said reset member to secure the driving member against rotation while it is uncoupled from the disc, and means operating concurrently with said release to recouple the disc into driven relation with the driving member and to disengage said locking means for freeing the driving member for further rotation.

11. An operating mechanism for a rotational device comprising, a driving member rotatable with said device, a disc coupled to said driving member for rotation thereby between start and stop positions, settable stop members at each of said positions, limit means carried by said disc and cooperating with said stop members to limit the extent of rotation of the disc, a reset member secured to said disc and operable at said stop position for uncoupling the disc from said driving member and for resetting the former to said start position, a shaft rotatably mounting said disc and reset member, a spring element cooperating with said shaft and reset member for locking the disc against axial movement on said shaft when said driving member is rotating the disc and during resetting of said disc, said spring element being operative to cooperate with said stop member at said start position at the end of a resetting movement to release said disc for axial movement on shaft, locking means to secure the driving member against rotation while it is uncoupled from the disc, and resilient means operating concurrently with said release to recouple the disc into driven relation with the driving member and to disengage said locking means for freeing the driving member for further rotation.

12. An operating mechanism according to claim 11 wherein said locking means are rendered effective by the operation of said reset member to secure said pinion against rotation while it is uncoupled from said disc.

13. An operating mechanism according to claim 11 wherein said spring element is formed of a helical spring having end leads, one of said leads effecting said axial locking of the disc on said shaft when the driving member is rotating the disc and the other of said leads effecting said axial locking of the disc on said shaft during resetting.

14. An operating mechanism according to claim 11 characterized further in that said locking means to secure the driving member against rotation while it is uncoupled from the disc comprises, a detent pin for locking the driving member, a feeler element controlling movement of the detent pin into and out of locking position, and means maintaining said feeler element in contact with said disc.

15. An operating mechanism according to claim 14 wherein said last mentioned means comprises a spring leaf carrying both the feeler element and the detent pin.

16. A variable control and locking mechanism for operating a rotary switch device comprising, a unidirectional Geneva pinion for transmitting motion to said device, a Geneva gear wheel coupled to said pinion for rotation thereby from a preselected one of a plurality of positions to a stop position, a fixed plate having said positions established thereon, stop members mounted respectively on said plate at said preselected position and said stop position, limit means carried by the Geneva wheel and cooperating with said stop members to limit the extent of rotation of the Geneva wheel, a reset member secured to said Geneva wheel and operable only at said stop position for uncoupling the Geneva wheel from said pinion and for resetting the former to said preselected position, a shaft secured to said plate and rotatably mounting said reset member, a spring element carried by the Geneva wheel and cooperating with said shaft and reset member for locking the Geneva wheel against axial movement on said shaft when said pinion is rotating the Geneva wheel and during resetting of said Geneva wheel, said spring element being operative to cooperate with said stop member at said preselected position at the end of a resetting movement to release said Geneva wheel for axial movement on said shaft, locking means rendered effective by the operation of said reset member to secure said pinion against rotation while it is uncoupled from the Geneva wheel, and spring means operating concurrently with said release to recouple the Geneva wheel into driven relation with said pinion and to disengage the locking means for freeing the pinion for further rotation.

17. A variable control and locking mechanism for operating a rotary switch device comprising, a Geneva pinion for transmitting motion to said device, a ratchet mechanism to control rotation of said pinion and device unidirectionally, a Geneva gear wheel coupled to said pinion for rotation thereby from a preselected one of a plurality of positions to a stop position, a fixed plate having said positions established thereon, stop members carried respectively on said plate at said preselected position and said stop position, limit means carried by the Geneva gear wheel and cooperating with said stop members to limit the extent of rotation of said wheel, a reset knob secured to said Geneva gear wheel and operable only at said stop position for uncoupling the Geneva wheel from said pinion and for resetting the former to said preselected position, said knob being formed with a bore and with spaced slots intercepting said bore, a reset shaft having a recess and being received in said bore and secured to said plate, said recess being aligned with one of said slots when said pinion is rotating the Geneva gear wheel and with another of said slots when said wheel is being reset, spring means having fingers received respectively in said slots and exerting pressure against said shaft, one of said fingers being received also in said recess when said first mentioned slot is aligned with said recess to thereby lock the Geneva gear wheel against axial movement on said shaft during said rotation of the gear wheel and another of said fingers being received also in said recess when said second mentioned slot is in alignment therewith to thereby lock the Geneva gear wheel against axial movement on said shaft when said wheel is being reset, said first mentioned finger being operative to cooperate with said stop member at the stop position to release the Geneva wheel for axial movement on said shaft and resetting, said second mentioned finger being operative to cooperate with said stop member at said preselected position at the end of a resetting movement to release said Geneva wheel for axial movement on said shaft, locking means rendered effective by the operation of said reset knob to secure said pinion against rotation while it is uncoupled from the Geneva wheel, and spring means operating concurrently with said last mentioned release to recouple the Geneva wheel into driven relation with said pinion and to disengage the locking means for freeing the pinion for further rotation.

18. A variable control and locking mechanism according to claim 17 characterized further in that said locking means to secure said pinion against rotation while it is uncoupled from the Geneva wheel comprises, a detent pin for locking the pinion, a feeler element controlling movement of the detent pin into and out of locking position and being in contact with said Geneva wheel, and a spring leaf effecting said contact and carrying both the feeler element and the detent pin.

19. Apparatus for controlling the rotary movements of a rotatable device comprising, means for rotating said device about a first axis, a stepping element having a starting position, means mounting said stepping element about a second axis substantially parallel to said first axis, means releasably coupling said rotatable device to said stepping element, said coupling means including means to rotate said stepping element a predetermined increment of a complete rotation, each increment representing a complete rotation of said rotary device, said stepping element being arranged to provide a predetermined number of such increments of rotation of said rotary device equal to the maximum number desired, and means for preselecting any number of the increments provided, beginning from said starting position of said stepping element.

20. Apparatus for controlling the rotary movements of a rotatable device comprising, means for rotating said device, a stepping element having a starting position, means mounting said stepping element adjacent to said rotatable device, means releasably coupling said rotatable device to said stepping element, said coupling means including means to move said stepping element a predetermined increment for each complete rotation of said rotary device, said stepping element being arranged to provide a predetermined number of such increments of movement by said rotary device equal to the maximum number desired, means for preselecting any number of the increments provided, beginning from the starting position of said stepping element, means to lock up said coupling means until said rotary device has been rotated a number of times equal to the number of said increments selected, means to unlock said coupling at the completion of the predetermined number of rotations of said rotary device, and means to reset said stepping element to its starting position.

21. Apparatus for controlling the rotary movements of a rotatable device comprising, means for rotating said device, a stepping element having a starting position, means mounting said stepping element adjacent to said rotatable device, means releasably coupling said rotatable device to said stepping element, said coupling means including means to move said stepping element a predetermined increment of its possible movement, each increment of movement being representative of a complete rotation of said rotary device, said stepping element being arranged to represent a predetermined number of such increments of rotation of said rotary device equal to the maximum number desired, means for preselecting any number of the increments provided, beginning from said starting position of said stepping element, means to lock up said coupling means until said rotary device has been rotated a number of times equal to the number of said increments selected, means to unlock said coupling at the completion of said rotations, means to reset said stepping element to said starting position, and means to lock up said rotatable device during resetting of said stepping element.

References Cited in the file of this patent
UNITED STATES PATENTS

| | | |
|---|---|---|
| 2,577,225 | Barry | Dec. 4, 1951 |
| 2,579,092 | Rockwell | Dec. 18, 1951 |
| 2,598,448 | Schultz | May 27, 1952 |
| 2,684,142 | Willyard et al. | July 20, 1954 |
| 2,810,302 | James et al. | Oct. 22, 1957 |